(12) United States Patent
Murphy et al.

(10) Patent No.: US 7,179,553 B2
(45) Date of Patent: Feb. 20, 2007

(54) METHOD FOR DETECTING ELECTRICAL DEFECTS IN MEMBRANE ELECTRODE ASSEMBLIES

(75) Inventors: Michael W Murphy, Manchester, NY (US); Brian A Litteer, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 370 days.

(21) Appl. No.: 10/236,804

(22) Filed: Sep. 6, 2002

(65) Prior Publication Data

US 2004/0048113 A1    Mar. 11, 2004

(51) Int. Cl.
| | |
|---|---|
| *H01M 8/00* | (2006.01) |
| *G01R 31/00* | (2006.01) |
| *G01N 27/26* | (2006.01) |
| *G01J 5/00* | (2006.01) |
| *G01M 3/04* | (2006.01) |

(52) U.S. Cl. .......................... 429/12; 429/30; 324/501; 204/421; 374/121; 250/340; 73/40

(58) Field of Classification Search .................. 429/13, 429/30, 12, 21, 23; 73/40, 38, 49.3, 46; 204/415, 416, 421; 250/340, 338.1; 374/45, 374/124, 121; 324/441, 444, 500, 501
See application file for complete search history.

(56) References Cited

U.S. PATENT DOCUMENTS

| | | | |
|---|---|---|---|
| 4,674,321 A | | 6/1987 | Joshi |
| 5,235,846 A | | 8/1993 | Fanciullo |
| 5,316,871 A | | 5/1994 | Swathirajan et al. |
| 5,483,068 A | * | 1/1996 | Moulton et al. ............ 250/340 |
| 5,753,088 A | | 5/1998 | Olk |
| 5,763,765 A | * | 6/1998 | Lamont et al. ............... 73/40.7 |
| 6,074,692 A | | 6/2000 | Hulett |
| 6,277,513 B1 | | 8/2001 | Swathirajan et al. |
| 6,350,539 B1 | | 2/2002 | Wood, III et al. |
| 6,358,642 B1 | | 3/2002 | Griffith et al. |
| 6,372,376 B1 | | 4/2002 | Fronk et al. |
| 2003/0076110 A1 | * | 4/2003 | Wang et al. ................. 324/444 |
| 2005/0181252 A1 | * | 8/2005 | Risen et al. .................... 429/30 |

OTHER PUBLICATIONS

Visualization with Mathematica, www.Wolfram.com, printed Jul. 29, 2002, 6 pgs.

ThermaCAM Researcher, FLIR Systems Inc., copyright 2001, 2 pgs.

ThermaCAM Reporter, www.flirthermography.com, printed Jun. 24, 2002, 3 pgs.

(Continued)

*Primary Examiner*—Raymond Alejandro
(74) *Attorney, Agent, or Firm*—Harness, Dickey & Pierce P.L.C.

(57) ABSTRACT

A method and system for detecting imperfections in a membrane electrode assembly of an electrochemical fuel cell, and more particularly for detecting defects within a proton exchange membrane in a membrane electrode assembly which is optionally sandwiched between conductive diffusion media layers or between conductive diffusion layers with at least one rigid solid that is transparent to infrared radiation. A potential voltage is applied across the membrane and the presence of a defect and preferably the location of a defect is determined by monitoring variations in intensity level of infrared radiation emitted from a surface of the membrane electrode assembly.

18 Claims, 7 Drawing Sheets

OTHER PUBLICATIONS

ThermaCAM PM 695 Infrared Camera, www.flirthermograpy.com, printed Jun. 21, 2002, 2 pgs.

Carbon Fibers, www.torayusa.com, printed Jun. 21, 2002, 3 pgs.

FLIR Systems, www.flirthermography.com, printed Jun. 19, 2002, 1 pg.

Infrared & Visible Imaging Combined in One Camera, Photonics Spectra, Dec. 2001, 3 pgs.

Advances Expand the Application Range of Thermal Imaging Systems, Control Solutions, Jun. 2001, 3 pgs.

* cited by examiner

METHOD FOR DETECTING ELECTRICAL DEFECTS IN MEMBRANE ELECTRODE ASSEMBLIES

FIELD OF THE INVENTION

The present invention relates to a method and system for detecting imperfections in a membrane electrode assembly.

BACKGROUND OF THE INVENTION

Electrochemical cells, such as a fuel cell, generate electricity through the electrochemical reaction of a reactant and an oxidant. An electrochemical fuel cell contains an anode and a cathode, with a proton exchange membrane between the two electrodes. A reductant is introduced at the anode and an oxidant at the cathode. A preferred fuel cell uses hydrogen ($H_2$) as the reductant, or fuel source, and oxygen ($O_2$) as the oxidizing agent either in pure gaseous form or combined with nitrogen as in air. During operation of the fuel cell, conductive elements proximate to the respective electrodes conduct electrons generated during the reduction-oxidation reaction occurring within the fuel cell.

A single fuel cell includes a membrane electrode assembly (MEA) which includes a proton exchange membrane (PEM) sandwiched between an anode electrode and cathode electrode, respectively. A polymer selected for use as a PEM desirably has unique characteristics including permeability to protons and electrical insulation. In practice, polymers that fulfill these requirements tend to be relatively fragile and thin, with a typical thickness of approximately 10 to 125 µm. When adding the electrodes to the PEM to form the MEA, the PEM is subjected to relatively high stress conditions including both high temperature and pressure. Since the PEM membrane is fragile, it is handled and processed carefully to minimize physical tears or thinning.

The electrodes attached to the PEM in a MEA may include finely divided catalytic particles (such as precious metals) to facilitate the respective electrochemical reactions, as well as, electrically conductive particles, such as for example, carbon. The precious metals and careful handling required during the manufacturing of the MEA are costly. Overall, the associated components and assembly related to the MEA often lead to imperfections or defects. Thus, there is a need for a method of detecting such imperfections or defects.

SUMMARY OF THE INVENTION

The present invention provides a method of detecting defects in an assembly having an electrically insulative membrane. The method includes applying a voltage across the electrically insulative membrane via first and second electrically conductive substrates which contact respective first and second surfaces of the membrane. In a preferred aspect, the method further includes detecting variations in the intensity level of infrared radiation emitted from the membrane by sensing infrared energy emitted from the surface of at least one of the first or said second electrically conductive substrates wherein such variations in intensity level of infrared radiation reveal the presence of, and preferably the location of, the defects.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In one aspect, the invention provides a method for determining the presence of defects in a membrane electrode assembly (MEA). In a preferred aspect, the location of defects in a MEA are determined. In one preferred embodiment of the present invention, electrical defects are detected by applying a potential difference across the MEA by a power supply means and using a thermal detection infrared radiation camera to detect the presence of defects and preferably the location of the defects. Before describing the invention in detail, it is useful to understand the basic elements of a fuel cell and components of the MEA where defects may arise.

Figure 1:
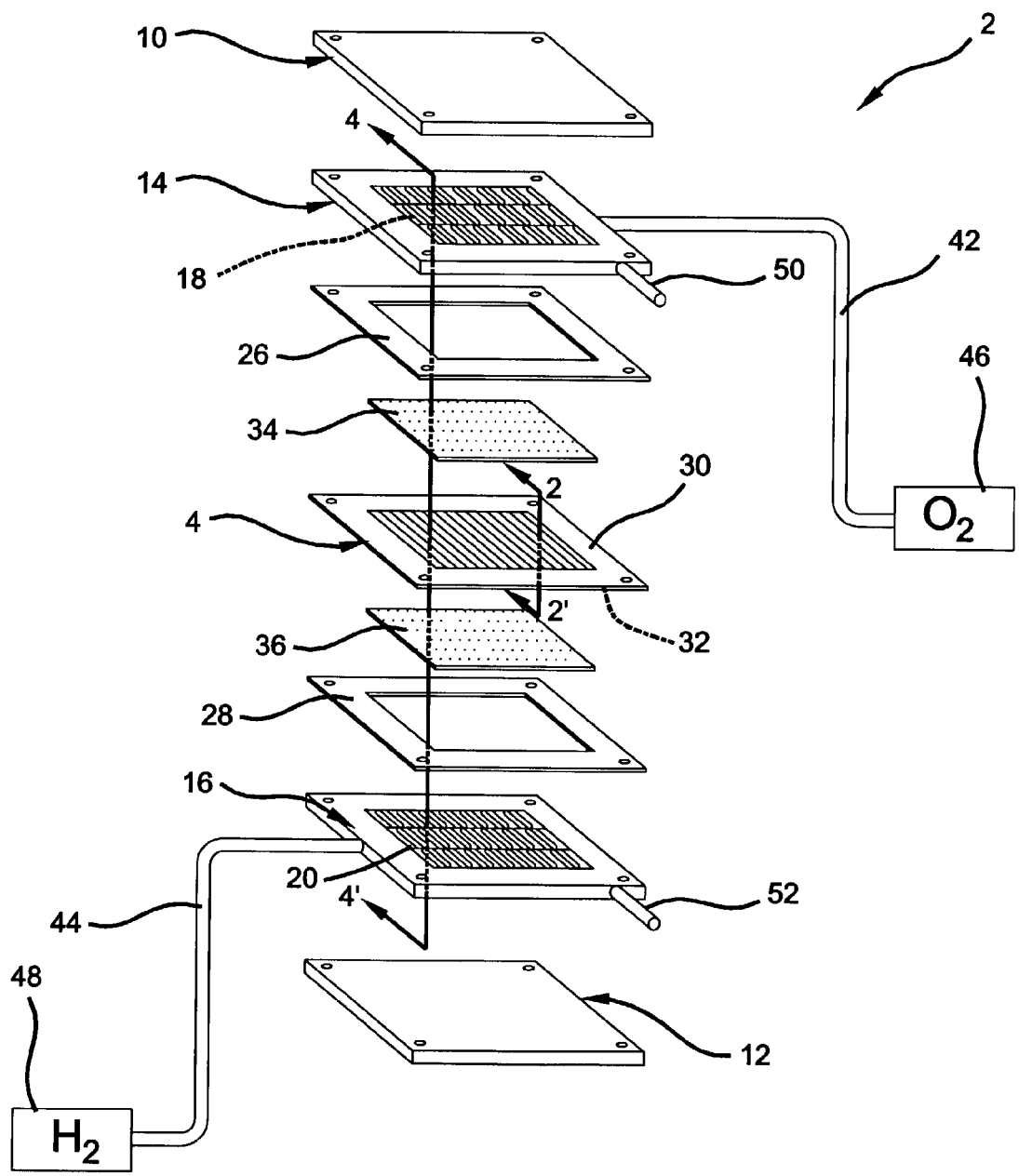
FIG. 1 is a schematic, exploded, isometric, illustration of a liquid-cooled proton exchange membrane (PEM) fuel cell.

Referring generally to FIG. 1, an exemplary membrane electrode assembly (MEA) is shown. FIG. 1 depicts a single cell, bipolar PEM fuel cell stack 2 having a membrane-electrode-assembly (MEA) 4. The MEA is separated from other fuel cells (not shown) in a stack by electrically conductive, liquid-cooled, bipolar plates 14,16. The MEA 4 and bipolar plate 14,16 are stacked together between stainless steel clamping plates 10 and 12. At least one of the working faces of the conductive bipolar plates 14,16 contains a plurality of grooves or channels 18, 20 for distributing fuel and oxidant gases (i.e., $H_2$ and $O_2$) to the MEA 4. Nonconductive gaskets 26, 28 provide seals and electrical insulation between the several components of the fuel cell stack. Gas permeable carbon/graphite diffusion layers 34, 36 press up against the electrode faces 30,32 of the MEA 4. The electrically conductive bipolar plates 14 and 16 press up against the carbon/graphite paper diffusion layers 34 and 36 respectively. Oxygen is supplied to the cathode side of the fuel cell stack from storage tank 46 via appropriate supply plumbing 42, while hydrogen is supplied to the anode side of the fuel cell from storage tank 48, via appropriate supply plumbing 44. Alternatively, air may be supplied to the cathode side from the ambient, and hydrogen to the anode from a methanol or gasoline reformer, or the like. Exhaust plumbing (not shown) for both the $H_2$ and $O_2$/air sides of the MEA 4 will also be provided. Additional plumbing 50, 52 is provided for supplying liquid coolant to the bipolar/end conductive plates 14,16. Appropriate plumbing for exhausting coolant from the end plates 14,16 is also provided, but not shown.

Figure 2:
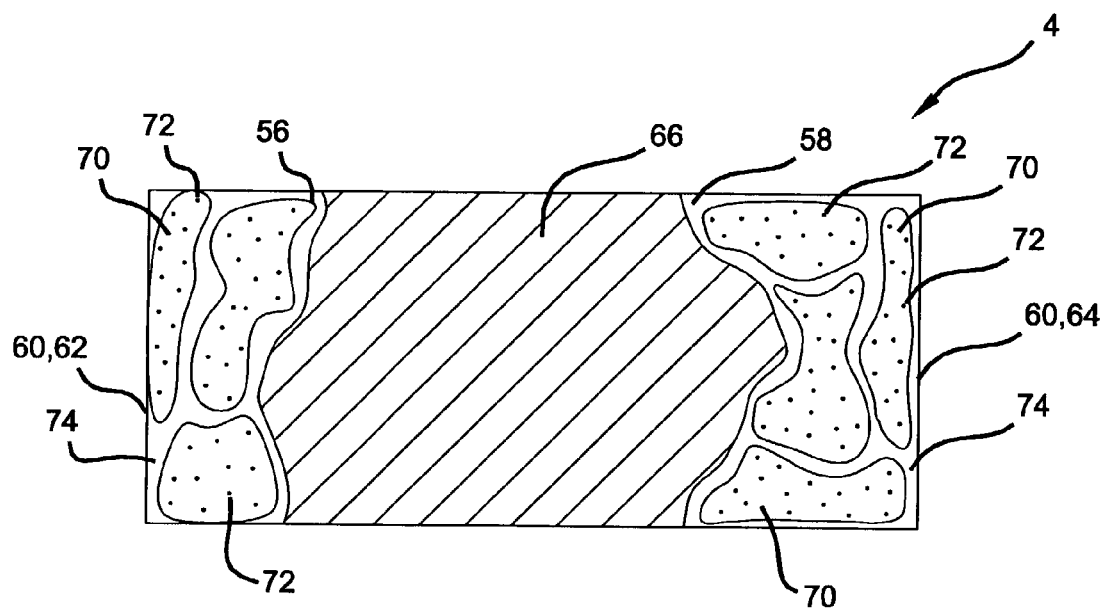
FIG. 2 is a cross-sectional view taken along line 2–2' of FIG. 1 showing an exemplary membrane electrode assembly (MEA)

Referring to FIG. 2, MEA 4 is shown where porous electrodes 60 form an anode 62 at the fuel side and a cathode 64 at the oxygen side. The anode 62 is separated from the cathode 64 by a proton exchange membrane (PEM) 66. The PEM 66 provides for ion transport, more specifically proton (i.e. H+) transport, to facilitate reactions in the fuel cell.

A preferred PEM membrane 66, is constructed of a proton-conductive polymer, which is well known in the art. This polymer is essentially an ion exchange resin that includes ionic groups in its polymeric structure that enables cation mobility through the polymer. One broad class of cation exchange, proton-conductive polymers is the so-called sulfonic acid cation exchange resin. One preferred resin of this type is a perfluorinated sulfonic acid polymer electrolyte in which the entire membrane structure has ion exchange characteristics. One commercial sulfonated perfluorocarbon, proton conductive membrane suitable for use as a PEM is sold by E. I. DuPont de Nemours & Co. under the trade designation NAFION®. Other proton conductive membranes are likewise commercially available for selection by one of skill in the art.

As shown in FIG. 2, the electrodes 60 on the opposing faces of the PEM membrane 56,58 forming the MEA 4 each comprise a respective group of finely divided carbon particles 70 with very finely divided catalytic particles 72, supported on internal and external surfaces of the carbon particles 70 and a proton conductive material 74 intermingled with the catalytic 72 and carbon 70 particles. The anode catalytic particles 72 preferably facilitate hydrogen gas ($H_2$) disassociation, whereby protons and free electrons are formed. Protons migrate across the PEM 66 to the cathode side 64 for reaction. The catalytic particles 72 present in the cathode 64 foster the reaction between protons and oxygen gas, creating water as a byproduct. A preferred catalytic material functions as a catalyst in both the anode and cathode reactions respectively, by way of example such a catalyst is platinum and its alloys.

The catalyst particles 72 or catalyst-bearing carbon particles 76 (FIGS. 2 and 3) are dispersed throughout a polymeric binder or matrix proton conductive material 74 which typically comprises either a proton conductive polymer and/or a fluoropolymer. When a proton-conductive material is used, it will typically comprise the same proton-conductive polymer as makes up the PEM 66 (e.g., NAFION®). The fluoropolymer typically comprises polytetrafluoroethylene (PTFE), though others such as FEP (Fluorinated Ethylene Propylene), PFA (Perfluoroalkoxy), and PVDF (Polyvinylidene Fluoride) are also used. These polymers create a robust structure for catalyst retention, adhere well to the PEM, aid in water management within the cell, and enhance ion exchange capacities of the electrodes.

Figure 3:
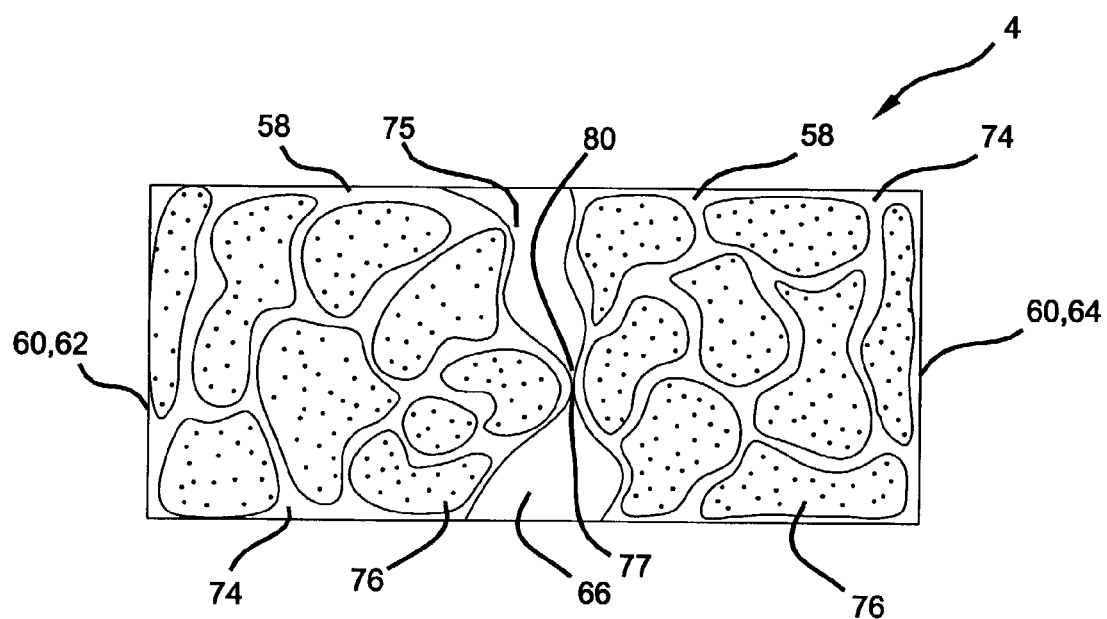
FIG. 3 is a magnified view of the MEA having conductive catalytic particles penetrating the PEM.

The at least partial embedding of electrodes 60 into the membrane 66 under pressure, provides for a continuous path of protons through conductive material 66, 74 from one side of the MEA 4 to the other. The intimate intermingling of proton conductive material 74 with catalyst 72 and carbon particles 70 provides a continuous path for protons to the catalyst site where reaction occurs. Electrodes 60 are attached to the PEM 66 by a variety of methods known in the art, such as, for example, those disclosed in U.S. Pat. Nos.: U.S. Pat. No. 6,074,692 issued on Jun. 13, 2000; U.S. Pat. No. 5,272,017 issued on Dec. 21, 1993; or U.S. Pat. No. 5,316,871, issued on May 31, 1994. One such method includes a hot-pressed electrode slurry that becomes essentially integral with the membrane 66. Thus, some catalytic carbon particles 76 may be at least partially set in the membrane 66 (see FIG. 3). These catalytic carbon particles 76 are abrasive, and when the PEM 66 is subjected to temperature and pressure of conventional processing conditions, weaker regions of the PEM 66 may be partially or completely penetrated, as shown respectively at 75, 77 in FIG. 3. This process of manufacturing the MEA 4 can promote electrical defects, if the conductive carbon particles 76 protrude too far into the membrane, as shown in FIG. 3, it causes an undesirable electrically conductive path, and hence a defect 80, between the opposing electrodes 62,64 through the PEM 66.

Figure 4:
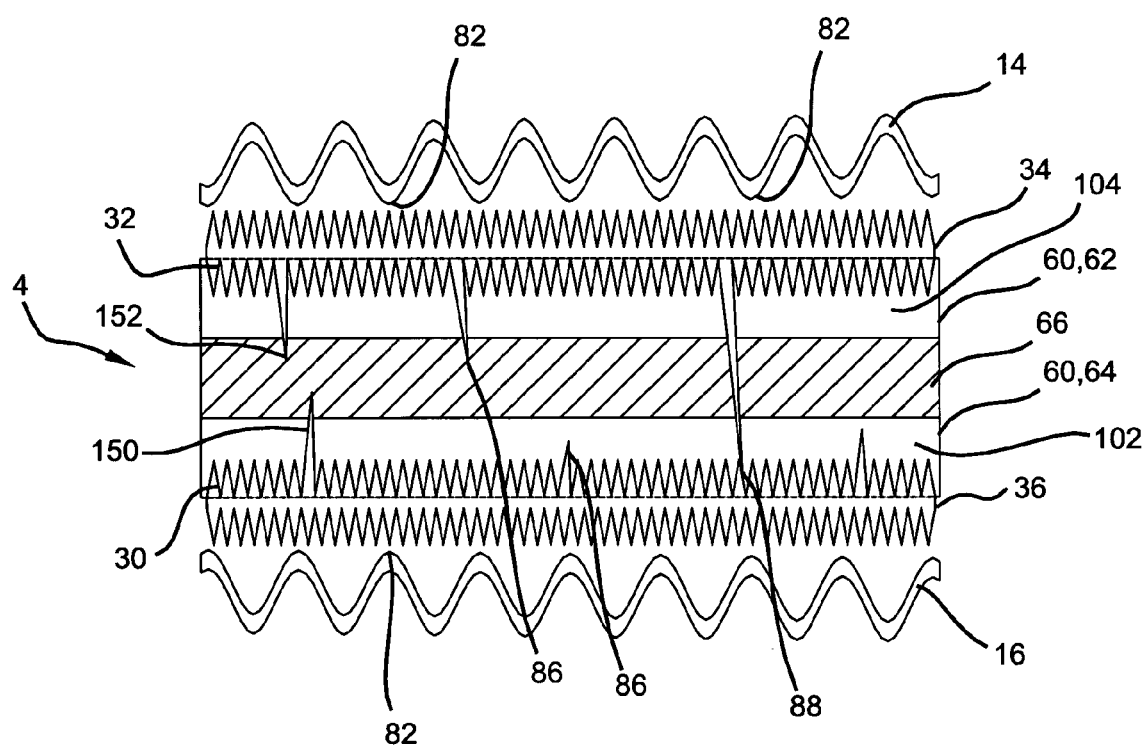
FIG. 4 is a cross-sectional view taken along line 4–4' of FIG. 1 of an exemplary MEA sandwiched between diffusion media layers and conductive plates.

As shown generally in FIGS. 1 and 4, electrical defects can also arise during subsequent construction steps in assembling the fuel cell. Within the fuel cell, the MEA 4 is compressed between two gas diffusion layers 34,36 bounded by electrically conductive electrode plates 14,16. The diffusion layers 34,36 press against both of the electrode faces 30,32 of the MEA 4 and serve as (1) the primary current collectors for the anode 62 and cathode 64, and (2) mechanical support for the MEA 4. The diffusion media is made from a gas permeable and conductive material forming the diffusion layer 34,36. This diffusion media is typically porous with about 80%–90% voids, and may comprise carbon or graphite paper or cloth, fine mesh noble metal screen, and the like, through which the gas can move to contact the MEA 4 underlying the lands 82, as is well known in the art. One such commercially available diffusion media is a graphite-fiber paper made by Toray Carbon Fibers America, Inc.

Many of the conductive diffusion media papers or cloths have rough surfaces with protrusions extending therefrom, primarily due to the nature and structure of the material and manufacturing process. These protrusions may impinge on the PEM 66 and become imbedded when pressure is applied during fuel cell operations. The diffusion layer protrusions 86 conduct electricity and may be long enough to partially or fully penetrate the membrane 66, creating potential electrical defects in the fuel cell. Thus, an electrically conductive path 88, or conduit, may be formed through the membrane 66 creating a short circuit. A conduit 88 occurs either when a protrusion 86 goes entirely through to the opposite side of the PEM, or two protrusions 150, 152 on opposite sides 62,64 of the MEA 4 partially penetrate the PEM 66 and meet or are in near proximity to one another.

In the fuel cell, the MEA 4 is pressed against a pair of diffusion layers 34,36 which are bounded by a pair of electrically conductive plates 14,16. The electrically conductive plates 14,16 each contain at least one so-called "flow field" that distributes the fuel cell's gaseous reactants (e.g., $H_2$ and $O_2$/air) over the surfaces of the anode 62 and cathode 64. The flow field includes a plurality of lands 82 which engage the primary current collector 34,36 and define therebetween a plurality of flow channels 18,20 through which the gaseous reactants flow between a supply manifold 42,44 at one end of the channel and an exhaust manifold 50,52 at the other end of the channel.

During the manufacturing and assembly of fuel cells, it is often advantageous to analyze the MEA 4 and diffusion layers 34,36 at a point in the process prior to final assembly within the fuel cell, where defects will be readily apparent. The MEA 4 can also be removed from an assembled fuel cell for the purposes of failure analysis. A preferred embodiment of the present invention tests an MEA 4 sandwiched between diffusion layers 34,36 prior to incorporating these components into a fuel cell. With respect to FIG. 5, a power supply means 90 applies voltage across the MEA 4. "Defect" as used herein, refers essentially to a flaw in the form of a short circuit through the PEM 66, where electrically conductive material penetrates partially or fully through to the opposite electrode providing a conductive pathway therethrough. The PEM 66, when operating properly without flaws or defects, should behave as a dielectric having nearly infinite resistance. Any current passing through the MEA 4 reveals electrical defects. If current does pass through the MEA 4, the material surrounding the short circuit heats up due to its resistant properties, creating a hot spot. The intensity of the heat generated at the hot spot establishes the severity of the defect 80. A thermal imaging device 92 capable of discerning gradations in temperature is scanned across the MEA electrode face or surface 30,32. The thermal imaging device 92 monitors the intensity and location of the defect 94 where the heat emissions emanate, revealing information about the existence of an electrical defect, and is particularly useful in categorizing the severity and location of the defect.

In accordance with the present invention, a potential difference or voltage is applied across the MEA 4 via a power supply source 90 to test the dielectric capacity of the MEA 4. Positive and negative leads 96,98 are attached to electrically conductive elements located on opposite sides 102,104 of the MEA 4. Such elements may include electrodes 60, however, conductive diffusion media layers 34,36 are preferred. The conductive diffusion media layer 34,36 facilitates an even charge distribution or density over the surface of the MEA electrode face 30,32 and minimizes differences in potential along the MEA face 30,32. Localized differences may lead to inaccurate results or inadvertent destruction of the PEM 66. When applying voltage to the MEA 4, it should not exceed the electrical breakdown voltage of the PEM 66, meaning the material is resistant to electric charge up to a certain threshold. If such breakdown voltage is exceeded, the material suffers from irreversible failure and conducts current therethrough. The electrical breakdown voltage varies depending upon the material of construction of the PEM 66, or membrane, within the MEA 4.

The theoretical voltage in an operating fuel cell is 1.23 Volts, as calculated by the theoretical energy created by the electrochemical reaction between $H_2$ and $O_2$. Thus, during operations, a nominal fuel cell electrical potential is achieved. However, during detection of the possible electrical defects, it may be advantageous to apply a greater voltage to reveal electrically conductive paths through the PEM 66. A preferred method of applying voltage is by means of a power source 90 operable to gradually increase the voltage. An exemplary range is 0 to about 5 Volts, with the most preferred range being 0 Volts to about 3 Volts. In a typical test regime, voltage is increased until defects are observed in a discernable thermal pattern corresponding to such defects.

Electrical defects present in the PEM 66 within the MEA 4 may vary in intensity. A direct correlation exists between the current passing through the PEM 66 at the site or position 94 of the electrical defect 80 and the heat emitted from the MEA 4. The electrically conductive path (80 or 88 depending on the source of the defect) exists within the internal PEM 66, where the heat is generated and radiates through the electrodes 60 to the surface of the electrode face of the MEA 30,32 above and below the site 94 of the defect 80,88. The surface position 94 of the heat source indicates the site of the underlying defect 80,88. Thus, monitoring the surface of the MEA 30,32 for the location and intensity of heat reveals information regarding the subsurface electrical defect.

Ascertaining the presence and extent of defects is important in quality control during manufacture of a fuel cell. Some of the defects may only be minimal and not adversely effect the operation of the MEA in a fuel cell environment, thus some minor defects may not be consequential to fuel cell operations. Other defects may preclude the use of a given MEA within an assembled fuel cell and are discarded. Thus, the ability to quickly determine the presence and preferably the extent of defects is important during manufacturing. Additionally, identifying the location of such defects is extremely valuable in determining the origin of the defects so they can be proactively eliminated in the fabrication of the MEA with the conductive diffusion media layers attached. This method may also be used to perform a postmortem analysis of a disassembled fuel cell to identify the source of MEA failure.

A further aspect of the present invention includes surface monitoring to determine the presence of defects, preferably the location of defects, and most preferably the extent of defects evidenced by the intensity level. In accordance with a preferred embodiment of the present invention, the surface of the MEA 30,32 or conductive diffusion media layer 34,36 is monitored for the intensity of thermal energy emissions with an infrared radiation detection device 92, preferably a thermographic device. The heated areas of the MEA surface 30,32 emit various energy waves including infrared radiation. A device capable of detecting infrared radiation (IR) 92 correlates the temperature of the surface with intensity of IR emissions. A preferred infrared radiation (IR) detection device 92 registers both the location and the intensity level or quantity of IR emissions, which are translated into temperatures along the surface of the scanned object. Infrared radiation comprises wavelengths in the range of approximately $0.8 \times 10^{-6}$ to $1 \times 10^{-3}$ meters of the electromagnetic spectrum. A preferred IR detection device 92 is a thermographic IR camera compatible with a software program that analyzes data regarding location and intensity. Such IR cameras 92 are commercially available, and characteristics of the IR device vary by equipment manufacturer.

One preferred IR thermography camera 92 is the Therm-CAM® PM 695 manufactured by FLIR Systems™. The detection system of this device monitors IR emissions from the surface within the spectral wavelength range of $7.5 \times 10^{-6}$ to $13 \times 10^{-6}$ meters. This camera measures temperature ranging from about −40° C. to about 1500° C., with the most preferred detection range from about −40° C. to about 120° C. Measurement modes include spot, area, isotherms, line profiles, and temperature gradients. The accuracy of the measurements is typically +/−2° C. or +/−2%.

Various commercially available software programs are compatible with thermal IR cameras 92, to enhance data acquisition and analysis (e.g. ThermaCAM Reporter Software from FLIR Systems™). These software programs augment information obtained by the IR camera 92 and can perform for example, temperature analysis (e.g. isotherm measurements, line profiles, and area histograms); static image analysis for stored images; and plotting of temperature over time (e.g. real time trending and analysis). The use of such software expedites evaluation of a thermal IR scan from the IR camera 92. Further, such software enhances pattern recognition for defect occurrences, in addition to a more sophisticated analysis of IR thermography images.

Figure 5:
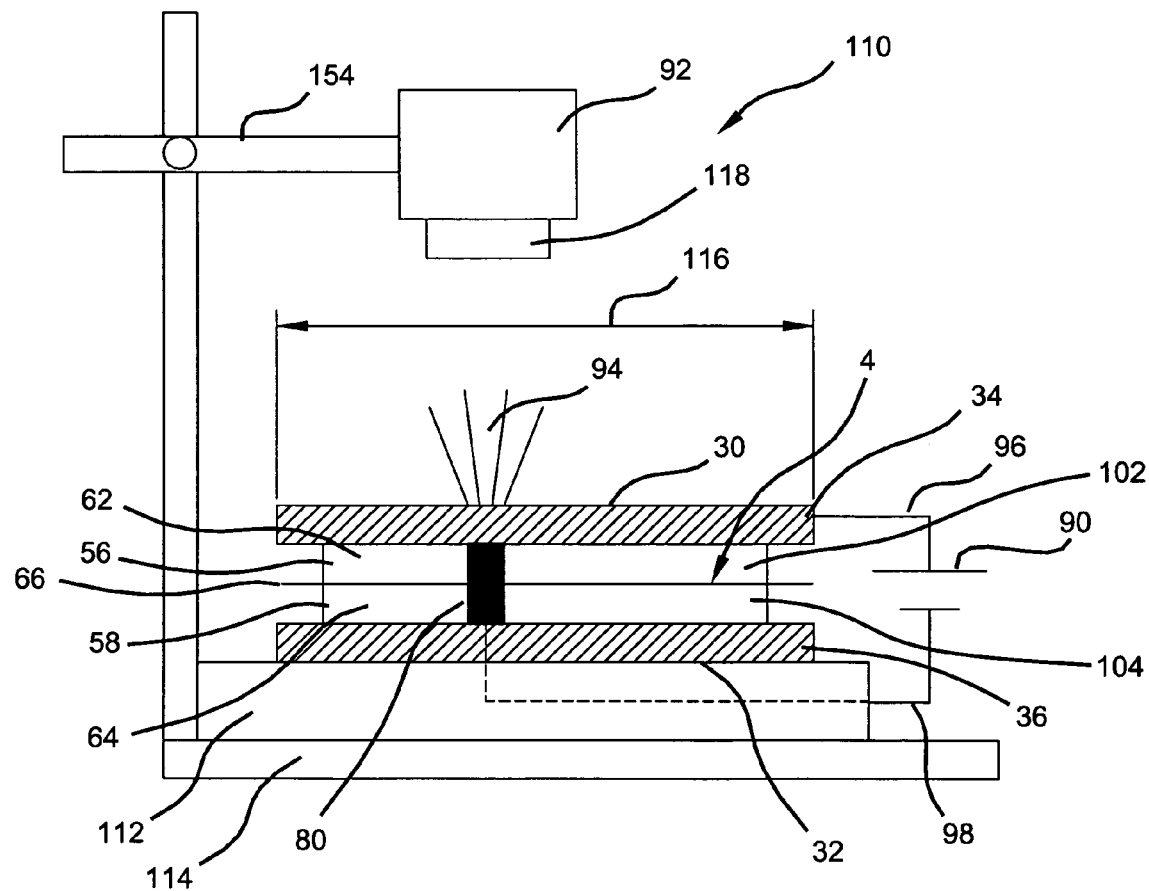
FIG. 5 is a schematic view of an exemplary infrared radiation testing and monitoring system.

Further with respect to FIG. 5, a preferred infrared testing system or monitoring apparatus 110 uses the IR camera 92 to scan a surface for thermal IR emissions. The IR camera 92 focuses on a stage 112 placed on a base 114, and is affixed to an adjustable support arm 154, with an adjustable distance between the stage 112 and the IR camera 92. The object to be scanned is placed on the stage 112, which is preferably constructed of a conductive material that enables charge distribution to the conductive portion of the MEA 34,36,62, or 64. An insulating construction material is preferred for the base 114 to prevent the charge applied to the stage 112 or MEA 4 from being conducted to other areas of the testing apparatus. The MEA 4 to be tested (or MEA with the conductive diffusion layers 34,36 attached) is placed on the stage 112 within the scanning area 116 of the IR camera 92. A power supply source 90 (e.g. a battery or a D.C. inverter) with both a positive 96 and negative lead 98 are attached to conductive portions of opposing sides 102,104 of the MEA 4, either directly to the electrodes 60 respectively; through the attached conductive diffusion layer 34,36 on opposing sides 102, 104 of the MEA 4; or through either a conductive diffusion layer 34,36 or electrode 60 on one side 102 of the MEA 4 and the conductive base 114 on the opposite side 104. The power supply 90 is activated and establishes a voltage, or potential difference across the MEA 4. The IR camera 92, through a lens 118, scans at least one surface of the MEA 102,104, preferably the face directed upwards towards the IR camera 92. Either of the sides 102, 104 of the MEA 4 will exhibit electrical defects 80 when they are present, so the MEA 4 can be positioned with either the cathode 64 or anode 62 side facing the IR camera 92. Establishing a potential difference across the membrane 66 through the electrodes 60 is independent of the particular electrode-power supply lead connection order, as both sides 62,64 are electrically conductive and will establish the electrical potential across the MEA 4 to conduct testing, so long as the charges are applied to opposing sides 102,104 of the MEA 4. As previously described, electrical defects 80 conduct current through the body of the MEA 4 and generate heat in localized regions or locations 94.

Figure 6:
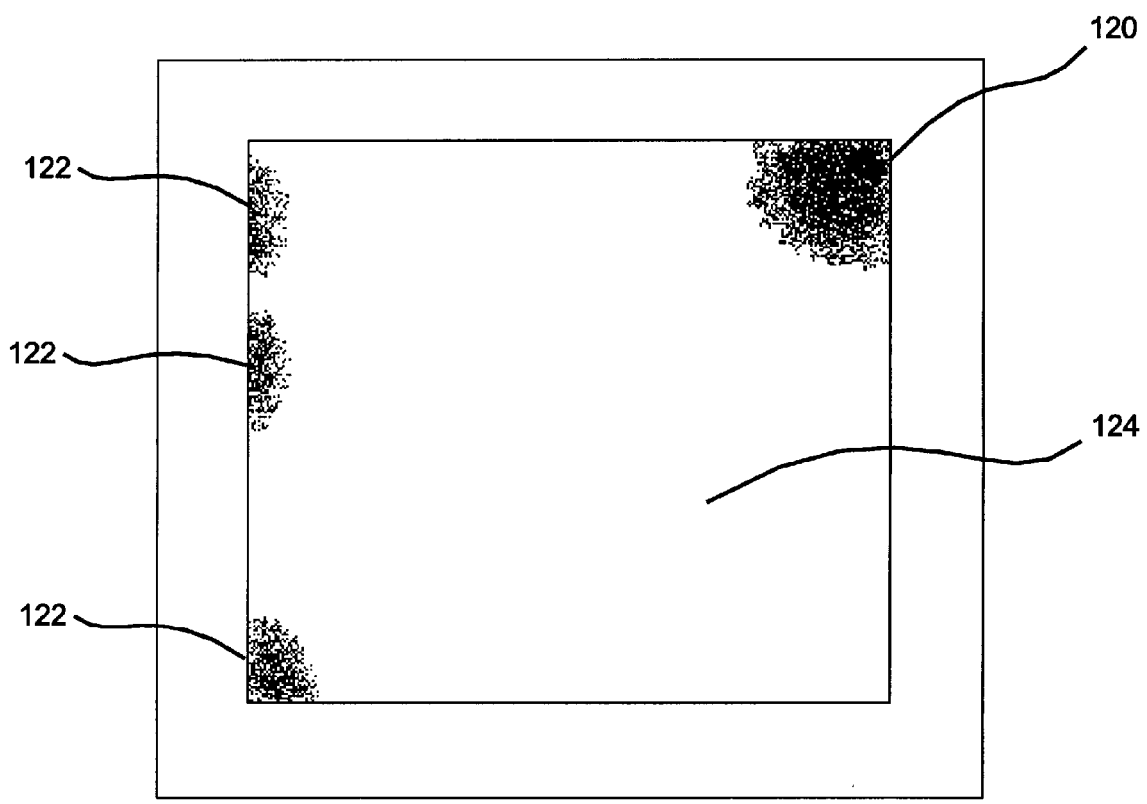
FIG. 6 is an example of a thermographic scan generated by the method of the present invention showing the MEA having defects.

The IR camera 92 scans the surface of the MEA 30,32 or diffusion media layer 34,36 for thermal IR emissions, and generates an output characterizing the IR or temperature gradients for the surface area, generally known as a thermographic image. The IR camera 92 creates thermal images with heat intensity translated either into gray-scale or color shading to create a visual image of the thermal variations in intensity. An example of such an image is shown in FIG. 6, where a high magnitude defect or primary defect 120 and smaller magnitude or secondary defects 122 are present amidst primarily non-defective areas 124 of the MEA 4. Accordingly, the extent or degree of defects is relatively determinable. Such an image may be described as having an x and y axis corresponding to the x and y axis of the scanned surface of the MEA 30,32 or diffusion media layer 34,36, where the x and y axis of the image form a two-dimensional grid. A defect, of hot spot, such as 120 or 122 has at least one coordinate with x and y values, that define the location of the defect. Thus, a primary defect 120 or secondary defect 122 may be located along the scanned surface either by visual inspection of the thermal image, or by analyzing a grid with x and y coordinates.

Alternately, a thermal profile may also be generated that creates a three-dimensional plot having an x, y, and z axis, where the x and y axes correspond to the length and width of the scanned surface of the MEA 30,32 or diffusion media layer 34,36. The z axis depicts the heat intensity of the scanned surface, where a hot spot formed by a primary or secondary defect would have a positive value z value and thus be higher than the surrounding non-defective areas 124 that emit no heat from the surface. Thus, the x, y, and z values of at least one coordinate in the profile would reveal the location and also the intensity along the scanned surface. A thermal profile can be created by various computer software programs that generate parametric three-dimensional plots based on input variables, such as x, y, and z. The IR camera 92 typically contains an internal CPU (central processing unit or computer) that processes data to create the output imagery. Further, the IR camera 92 optionally transports output data detailing the data from the IR scan of the area which can be further manipulated in an external processing unit (i.e. CPU), or computer. The output data transported to a CPU can be processed and analyzed by software programs described above to provide more detailed information regarding the thermal imagery. Further, output data may be analyzed to determine the location of hot spots by variable or pattern analysis.

In accordance with another preferred embodiment of the present invention, the monitoring apparatus 110 that is adapted to a manufacturing process involving automated conveyance of the MEA 4. In such a scenario, the stage 112 may be adapted to an automated assembly process that transports the MEA 4 to the appropriate position within the scanning area 116 beneath the IR camera 92. If necessary, the MEA assembly 4 could be placed on an independent insulating base 114. A voltage is applied across the MEA 4 by connecting the leads 96,98 from a power source 90 to opposite sides of the MEA 102,104. The IR scan by an IR camera 92 provides an image for interpretation to ascertain the presence of defects 80 in the MEA 4. Thus, the method of the present invention is readily adaptable to an automated manufacturing process.

The monitoring apparatus 110 detects the presence and/or extent of defects present in the MEA 4 being tested. Other forms of thermal monitoring equipment and sensors are contemplated and can be used interchangeably to determine temperature variations on the surface of the MEA 30,32, such as heat sensitive paper, or the like. However, IR cameras 92 have proven the most accurate and reliable thermal imaging equipment currently commercially available.

Figure 7:
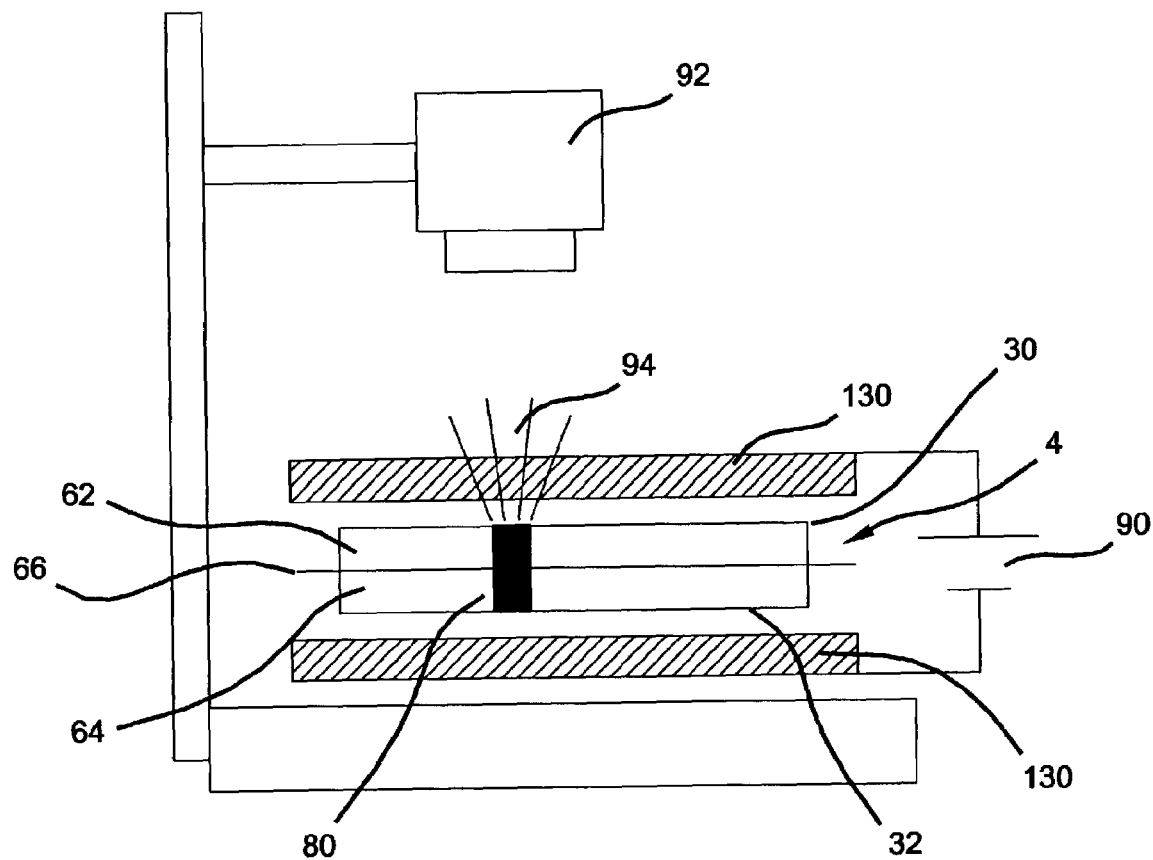
FIG. 7 is a schematic view of a general layout of another exemplary infrared testing and monitoring system having conductive substrates.

Another alternate embodiment of the present invention shown in FIG. 7 includes testing the MEA 4 without any diffusion layers attached. This testing scenario may be desirable if only the MEA 4 with electrodes 60 and PEM 66 are to be evaluated. Should it be necessary to test only the MEA 4, a highly conductive surface 130 may be placed at each electrode face 30,32 of the MEA 4 to promote even charge distribution or density across the electrodes 60 and the MEA 4. A preferred conductive surface 130 includes one that will not occlude the IR emissions radiating from the MEA that must be detected by the IR scanning device, such as for example, conductive materials like carbon or graphite paper or cloth.

Figure 8:
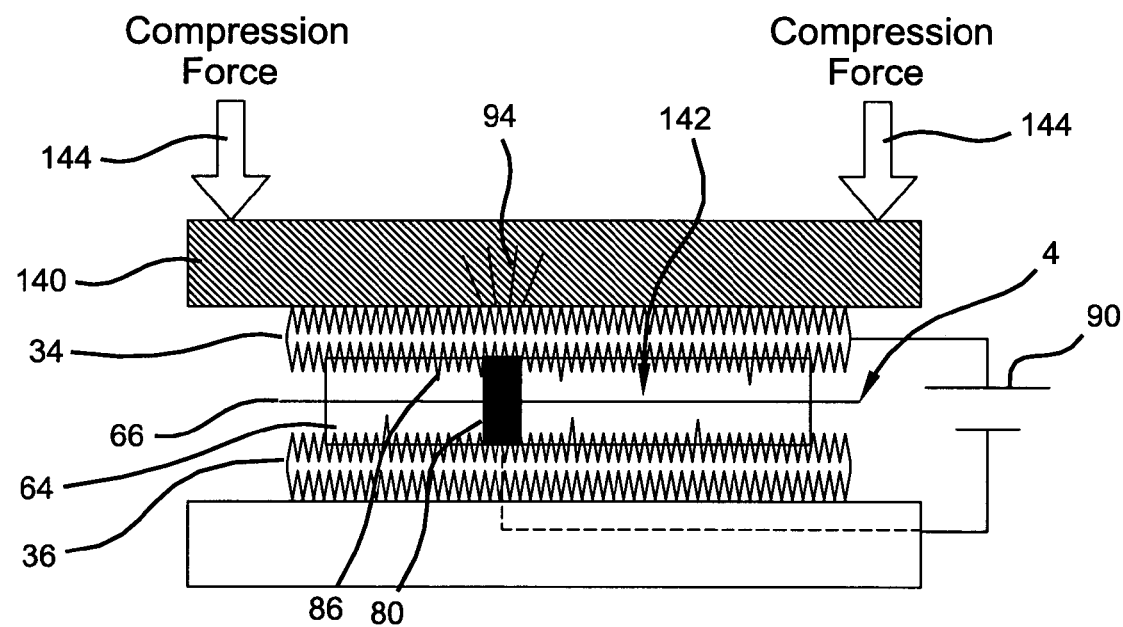
FIG. 8 is a schematic of a portion of an infrared testing and monitoring system having an infrared radiation transparent solid with an external pressure exerted on the MEA.

Another preferred embodiment of the present invention, shown in FIG. 8, includes testing the integrity of the MEA 4 with conductive diffusion media layers 34,36 attached and at least one of the conductive diffusion layers 34,36 compressed by a solid surface 140. Preferably, the solid 140 is rigid and transparent to the IR emissions, so that the detection and monitoring by the IR camera 92 is not impeded. Occasionally, problems with physical disassociation of the MEA 4 attached to the conductive diffusion layers 34,36 occur during testing, such that one or both of the diffusion layers 34,36 separate from the MEA 4. The withdrawal of the cloth or paper away from the MEA 4 also removes the electrically conductive protrusions 86 from the MEA 4, which eliminates or reduces the electrical defects 80. However, when the MEA 4 and diffusion layers 34,36 are subsequently incorporated into a fuel cell, the electrically conductive protrusions 86 re-enter the MEA 4 and cause short circuiting. Thus, in some testing scenarios, it is necessary to apply pressure to the MEA 4 and diffusion media layers 34,36 to ensure all defects 80 are tested. One preferred method of applying pressure to the MEA 4 and diffusion media layer 34,36 assembly is via an IR transparent solid pressed into the MEA on one side 142 by exerting external pressure 144 to at least one side. As shown, the solid is only needed on one side of the MEA and diffusion layer media, because the stage and base are located below and contain the diffusion media layers. Alternate configurations include those where two solid plates 140 are compressed against both sides 102, 104 of the MEA 4. This could be merely a way to exert pressure on the MEA 4, or if a dual camera system is used, it may be necessary to have an IR transparent solid on both sides, to scan each side of the MEA 4. One preferred example of such a transparent solid is zinc-selenium glass having a thickness of approximately ½", however, a variety of materials available to one of skill in the art may be used. The preferred range of pressure the solid 140 must withstand is between 0 and about 80 p.s.i. This alternate embodiment can be used in all of the previously described detection methods.

The present invention relates to a method of detection of defects, electrical in nature, that occur within the MEA 4. More particularly, these defects often occur within the MEA 4 with conductive diffusion layers 34,36 attached. First, the MEA 4 (or the MEA 4 with diffusion layers 34,36 attached) is placed under the thermal imaging scanning device 92. Next, a potential difference, or voltage is applied across the MEA 4 by a power supply source 90. At least one surface of the MEA 30,32 is scanned for a thermal image by the thermal imaging scanning device 92. Further, the thermal imaging scanning device 92 creates a thermal image of the surface 30,32, which depicts locations 94 and variations in thermal intensity. The thermal intensity of the MEA 4 is evaluated, where greater intensity in certain regions as compared with surrounding areas along the surface 30,32, indicating an electrical defect 80 is present in the MEA 4. If a defect 80 is present on the MEA 4, it is isolated and subjected to further analysis. If the MEA 4 is defect-free or not functionally compromised by the severity of the defect, it can be incorporated into a fuel cell.

Current methods of performing quality control pertain to leak detection by physical infiltration of gases through perforations in the membrane of a polymeric membrane, however these methods do not provide information regarding electrical defects in an MEA. There is a need for a non-intrusive method of identifying both the intensity and/or location of an electrical defect occurring within an MEA in a fuel cell for quality assurance and control.

Those skilled in the art will recognize the utility of the present invention, which provides a facile method of evaluating the most expensive and failure-prone components of fuel cells, the MEA. Electrical defects in the MEA have proven to be an extensive problem in the art, and the present invention provides a fast, efficient, and non-intrusive method of detecting such defects, which is readily adaptable to continuous manufacturing settings and quality control analysis.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for determining the presence of defects in a membrane electrode assembly having a proton exchange membrane and electrodes disposed at opposite faces of the proton exchange membrane comprising:

applying a diagnostic potential difference from an external power source across the membrane electrode assembly of an unassembled fuel cell; and monitoring infrared radiation emitted from a surface of at least one of said electrodes while the diagnostic potential difference is applied to the membrane electrode assembly to determine the presence or absence of a defect in the membrane electrode assembly.

2. The method according to claim 1, wherein the membrane electrode assembly is disposed between generally planar elements, at least one of which is transparent to infrared radiation.

3. The method according to claim 1, wherein said monitoring is accomplished by an infrared radiation camera capable of generating thermographic images.

4. The method according to claim 1, wherein said monitoring is conducted by detecting infrared radiation in a range of wavelengths from about 7 μm to about 13 μm.

5. The method according to claim 1, wherein said monitoring is conducted by detecting temperature in a range of from about −40° C. to about 120° C.

6. The method according to claim 1, wherein said potential difference is supplied by a power supply source ranging from greater than zero to about 5 Volts.

7. The method according to claim 1, wherein an intensity level of said infrared radiation emitted from a surface of the membrane electrode assembly reveals a location a defect when said defect is present.

8. A method of detecting any defects in a membrane, which is electrically insulative except for the presence of any defects, said method comprising:

applying a diagnostic voltage from an external power source across the membrane of an unassembled fuel cell via a first and a second electrically conductive substrate respectively contacting a first and a second surface of the membrane;

monitoring variations of infrared radiation emitted from the surface of at least one of said first or said second electrically conductive substrates while the diagnostic voltage is applied to the membrane electrode assembly wherein said variations of infrared radiation reveal the presence of any defects.

9. The method according to claim 8, wherein the membrane is disposed between generally planar elements, at least one of which is transparent to infrared radiation.

10. The method according to claim 8, wherein said detecting is accomplished by an infrared radiation camera capable of generating thermographic images.

11. The method according to claim 8, wherein said detecting is conducted by detecting infrared radiation in a range of wavelengths from about 7 μm to about 13 μm.

12. The method according to claim 8, wherein said detecting is conducted by detecting temperature in a range of from about −40° C. to about 120° C.

13. The method according to claim 8, wherein said diagnostic voltage is supplied by a power supply source ranging from greater than zero to about 5 Volts.

14. The method according to claim 8, wherein said variations in intensity level of infrared radiation reveals a location of any defects.

15. A method of detecting and locating defects in a membrane which is electrically insulative except for the presence of defects, the membrane having first and second surfaces contacting first and second electrode layers, respectively, forming a membrane electrode assembly, the method comprising:

applying a diagnostic potential difference from an external power source across the first and second electrode layers prior to assembly of the membrane in a fuel cell, wherein said diagnostic potential difference is maintained across the membrane in the absence of a defect, and wherein said diagnostic potential difference decreases as a current flows between the first and second electrode layers in the presence of a defect, said current flow generating hot spots on at least one of the first and second surfaces of the membrane; and determining the location of any hot spots along a surface of at least one of the first and second eiectrode layers.

16. The method according to claim 15, wherein determining the location of any hot spots along said surface of at least one of the first and second electrode is accomplished by generating a thermal image comprising:

an x and y axis forming a two-dimensional grid; and wherein any hot spot has at least one coordinate having x and y values within said grid and said at least one coordinate translates to the location of the defect along said surface.

17. The method according to claim 15, wherein determining the location of any hot spots along said surface of at least one of the first and second electrode layers is accomplished by generating a thermal profile comprising:

a three-dimensional plot having an x, y and z axis, wherein said x and y axis correspond to a length and a width of said surface, said z axis displays heat intensity level; and wherein the location of any hot spots corresponds to at least one coordinate with x, y, and z values within said plot, wherein said z value has a heat intensity, and said at least one coordinate reveals the location and an intensity of the defect along said surface.

18. The method according to claim 15, wherein determining the location of any hot spots is accomplished by pattern analysis of the infrared emission data performed by a processor unit.

\* \* \* \* \*